(12) United States Patent
Stimpson

(10) Patent No.: US 7,692,554 B2
(45) Date of Patent: Apr. 6, 2010

(54) SOUND GENERATING DEVICE

(75) Inventor: Robert William Stimpson, Douglas (GB)

(73) Assignee: DLP Limited (GB)

( * ) Notice: Subject to any disclaimer, the term of this patent is extended or adjusted under 35 U.S.C. 154(b) by 292 days.

(21) Appl. No.: 11/814,099

(22) PCT Filed: Feb. 16, 2006

(86) PCT No.: PCT/GB2006/000542

§ 371 (c)(1),
(2), (4) Date: Jul. 17, 2007

(87) PCT Pub. No.: WO2006/087552

PCT Pub. Date: Aug. 24, 2006

(65) Prior Publication Data

US 2008/0048871 A1 Feb. 28, 2008

(30) Foreign Application Priority Data

Feb. 16, 2005 (GB) ................................. 0503175.2

(51) Int. Cl.
G08B 3/00 (2006.01)
G08B 5/00 (2006.01)
G08B 7/00 (2006.01)
(52) U.S. Cl. ................................. 340/691.1; 340/686.1
(58) Field of Classification Search .............. 340/691.1, 340/686.1, 686.6, 573.1, 573.4
See application file for complete search history.

(56) References Cited

U.S. PATENT DOCUMENTS

| 4,177,686 A | 12/1979 | Jacob |
| 5,508,699 A | 4/1996 | Silverman |
| 5,646,601 A * | 7/1997 | Wallace et al. ........... 340/686.1 |
| 5,690,277 A | 11/1997 | Flood |
| 5,731,757 A * | 3/1998 | Layson, Jr. ................ 340/573.1 |
| 5,748,096 A * | 5/1998 | Kaufer ..................... 340/686.1 |
| 6,411,207 B2 * | 6/2002 | Shaffer .................... 340/691.1 |
| 6,426,701 B1 * | 7/2002 | Levy et al. ................ 340/573.1 |
| 6,549,142 B2 * | 4/2003 | Thomas et al. ........... 340/691.1 |
| 6,771,165 B2 * | 8/2004 | Burg, II et al. ........... 340/691.1 |
| 6,788,206 B1 | 9/2004 | Edwards |
| 2004/0177686 A1 | 9/2004 | Johansson |
| 2004/0193324 A1 | 9/2004 | Hoog et al. |
| 2005/0017869 A1 | 1/2005 | Fielmann |

FOREIGN PATENT DOCUMENTS

| FR | 2 753 426 A | 3/1998 |
| GB | 2 329063 A | 3/1999 |
| JP | 03199784 A | 8/1991 |
| JP | 11033052 A | 2/1999 |
| JP | 11 339160 A | 10/1999 |
| JP | 2000 039145 A | 2/2000 |
| JP | 2004 243107 | 2/2004 |
| JP | 2004 286260 A | 10/2004 |
| WO | WO 00/37222 A | 6/2000 |

\* cited by examiner

*Primary Examiner*—John A Tweel, Jr.
(74) *Attorney, Agent, or Firm*—Fleit Gibbons Gutman Bongini & Bianco; Paul D. Bianco; Martin Fleit

(57) ABSTRACT

A sound generating device for invalid apparatus as herein defined comprises a monitoring circuit and an audible output device for outputting an audible indication corresponding to the status and/or relative proximity of the in use apparatus monitored by the monitoring circuit. Body soaking apparatus, a seat, a handle, and invalid apparatus having such a sound generating device are also provided.

6 Claims, 1 Drawing Sheet

SOUND GENERATING DEVICE

This application is a national stage application of PCT/GB06/00542, filed Feb. 16, 2006.

FIELD OF THE INVENTION

This invention relates to a sound generating device for apparatus capable of use by invalids or the infirm, and to apparatus having such a sound generating device.

BACKGROUND OF THE INVENTION

The term 'invalid' used herein throughout is intended to mean an invalid, patient, infirm, disabled and/or elderly person.

The term 'apparatus' used herein throughout is intended to mean any apparatus or equipment, such as a bath, shower, seat, handle, capable of being used by an invalid as defined above. The apparatus may also be useable by able bodied persons.

It is often difficult, especially for infirm and/or partially sighted users, to determine the status or condition of particular apparatus or equipment, such as showers and foldable shower seats. The temperature of the shower water can be easily misjudged, resulting in possible scalding; and the incorrect positioning of the seat can, for example, lead to the person falling.

It is also problematic, when a person's sight is impaired, to determine the relative proximity of equipment or apparatus, such as chairs, handles and the side of a bath, for example.

It is known from JP2004-286260A to provide a remote control device for a water heater. The device utilises audible indications to notify a user of settings following adjustment. However, a new setting inputted by a user immediately occurs, with the audible indication being simultaneously output. This is not appropriate for an infirm or elderly user, who may wish to reconsider their actions.

The present invention seeks to provide a solution to these problems.

SUMMARY OF THE INVENTION

In accordance with the invention, there is provided invalid apparatus as herebefore defined, comprising a sound generating device including a monitoring circuit and an audible output device for outputting an audible indication corresponding to the status and/or relative proximity of the apparatus monitored by the monitoring circuit, the monitoring circuit of the sound generating device having means for determining the position and/or status of one or more parts of the apparatus, and the sound generating device outputs an audible indication corresponding to the position and/or status of the or each part, characterised in that the audible indication is outputted before the condition of the or each part changes.

Preferable and/or optional features of the invention are set forth in the claims.

DETAILED DESCRIPTION OF THE INVENTION

Figure 1:
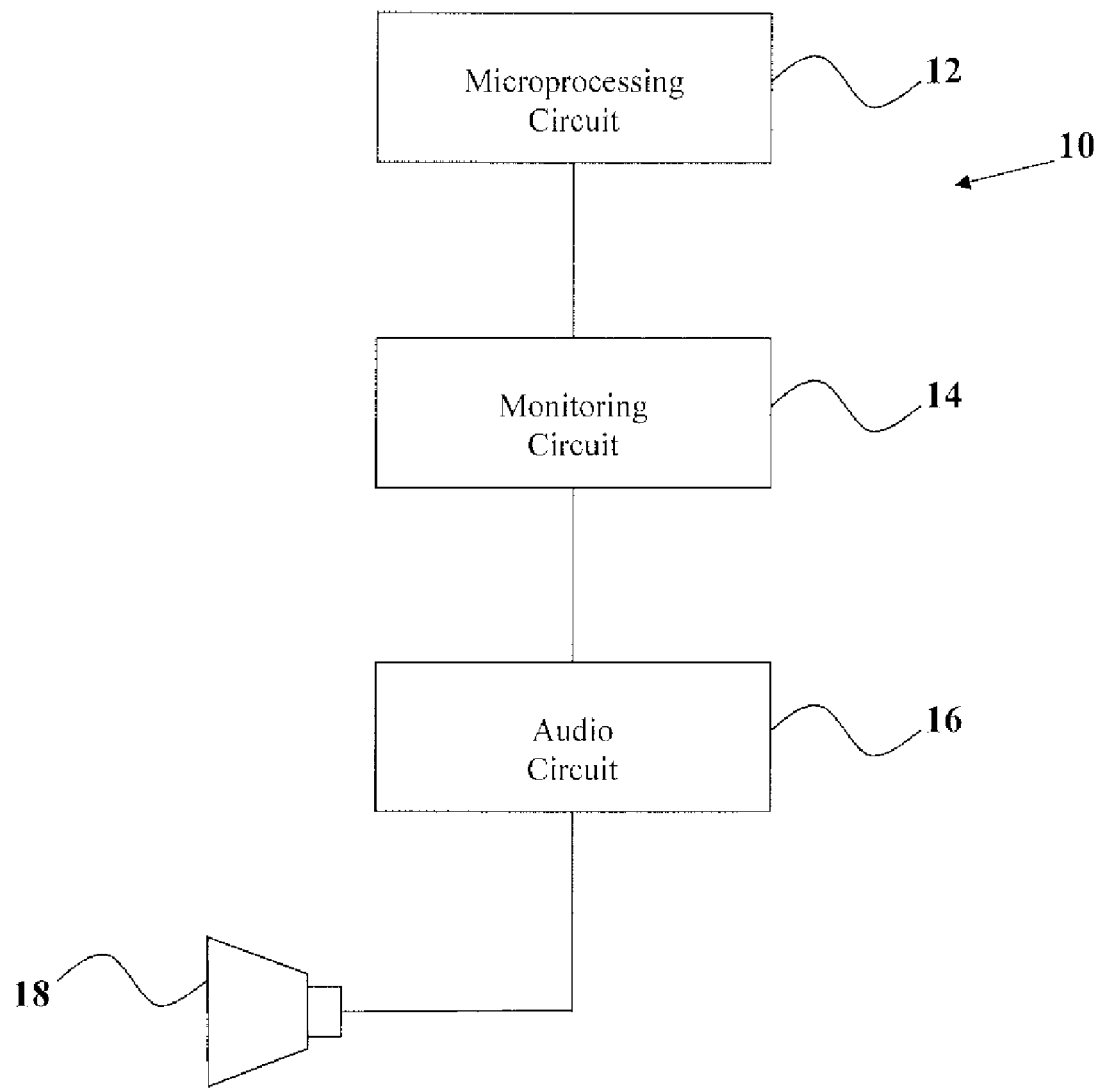
FIG. 1 shows a schematic diagram of an embodiment of the sound generating device according to the present invention.

One embodiment of a sound generating device 10 comprises a micro-processing circuit 12, a monitoring circuit 14 electrically connected to the micro-processing circuit, an audio circuit 16 electrically connected to the micro-processing circuit, and an audible output device 18, such as a speaker, driven by the audio circuit 16.

The audio circuit 16 includes set commands for driving the speaker to output different voice messages. The voice of the message is typically a digitally synthesized voice, or a recording of a human voice. The audio circuit 16 can therefore include an electronically accessible data storage device for the storage of various voice messages.

The language of the voice message can be dependent on the language of the user or users using the sound generating device 10, and may be selectable at the time of installation, or changeable after installation.

The monitoring circuit 14 can include a variety of sensors. When the sound generating device 10 is to be incorporated as part of a shower or bath, for example, a water temperature sensor, water flow rate sensor, water supply pressure sensor and/or power supply sensor can be provided. In this case, the sound generating device 10 is, typically electrically, connected to a control system of either the shower or bath or other apparatus. The control system of the shower is usually the control unit mounted adjacent one wall of the shower area or cubicle; and the control system of the bath is typically the or each tap.

If the sound generating device 10 is to be used with a bath, a water depth sensor may additionally or alternatively be provided.

Other sensors can be provided depending on the type of body soaking apparatus. For example, if the apparatus is a whirlpool spa or body massaging unit, rather than a shower or standard bath, then a sensor monitoring jet pressure or bubble pressure from respective heads can be incorporated.

If the sound generating device 10 is to be incorporated in a foldable seat, for example a shower seat, chair or other equipment with movable parts, such as a rotatable handle, then means for determining the position of one or more or the movable parts are included as part of the monitoring circuit 14. The position determining means can take the form of a switch, for example a micro-switch or a position sensor mounted to determine the position of the or each movable part.

In all of the above instances, when the sensor or position determining means detects a change in the condition or status of the apparatus being used, the monitoring circuit 14 outputs a signal to the micro-processing circuit 12, corresponding to the change. The micro-processing circuit 12 then controls the audio circuit 16 to output an appropriate audible indication corresponding to the specific detected change.

By way of example, audible indications may be:

"The power supply is switched off";

"Low pressure water supply fault";

"Please contact the system installer";

"Shower is off";

"Shower is on";

"Water flow low";

"Water flow high";

"Water flow medium";

"Temperature low";

"Temperature high",

The monitoring means 14 can also include one or more proximity sensors. This is beneficial for determining the relative position of the user as the user approaches the apparatus and before contact is actually made. Similarly to the above, when the proximity sensor determines the approach of a user, the monitoring means 14 outputs an appropriate signal to the micro-processing circuit 12, which in turn controls the audio circuit 16 to output a specific audible indication. The outputted audible indication may also be based on one or more of the conditions sensed by the other sensors, such as "Seat is near, and folded up".

The audible indication is preferably only made when a change in condition or status of the apparatus, or approach towards the apparatus, is detected. The audible indication is preferably not continuous. However, the sound generating device 10 can include means for setting the audible indication to repeat one or more times, or for the audible indication to repeat continuously in the event of a predetermined parameter being exceeded, for example water temperature sensed as being too hot.

It is therefore possible to provide invalid apparatus which monitors a status and/or condition, and provides a spoken audible indication of that status and/or condition. It is also possible to provide an independent sound generating device which can be incorporated into invalid apparatus at the time of installation, or post-installation as an additional 'add-on' item.

The embodiments described above are given by way of examples only, and modifications will be apparent to persons skilled in the art without departing from the scope of the invention as defined by the appended claims.

The invention claimed is:

1. An invalid apparatus, comprising a sound generating device including a monitoring circuit and an audible output device for outputting an audible indication corresponding to status/condition of one or more parts of the apparatus and/or relative proximity of the apparatus to a user thereof, monitored by the monitoring circuit, the monitoring circuit of the sound generating device having means for determining position and/or the status/condition of one or more parts of the apparatus, wherein the sound generating device outputs an audible indication corresponding to a relative position and/or status/condition of the or each part, the audible indication being outputted upon detection of an approach towards the apparatus before the status/condition of the or each part changes and upon detection of a change in the status/condition of the or each part of the apparatus.

2. The invalid apparatus as claimed in claim 1, wherein a different audible indication is outputted from the audible output device dependent upon a specific status of the apparatus monitored by the monitoring circuit.

3. The invalid apparatus as claimed in claim 1, wherein the audible indication is a voice message.

4. The invalid apparatus as claimed in claim 1, wherein the monitoring circuit includes a proximity sensor for determining the position of a user relative to the apparatus.

5. The invalid apparatus as claimed in claim 1, wherein the monitoring circuit includes a water temperature sensor, a flow rate sensor, a water pressure sensor, a water depth sensor, and/or a power supply sensor.

6. The invalid apparatus as claimed in claim 1, wherein the monitoring circuit includes means for determining the position of one or more movable parts of the apparatus.

* * * * *